US008608566B2

(12) United States Patent
Guinchard et al.

(10) Patent No.: US 8,608,566 B2
(45) Date of Patent: Dec. 17, 2013

(54) MUSIC VIDEO GAME WITH GUITAR CONTROLLER HAVING AUXILIARY PALM INPUT

(75) Inventors: Lee Guinchard, Mountain View, CA (US); Travis Chen, Woodland Hills, CA (US); Brian Bright, Woodland Hills, CA (US); Clark Wen, Woodland Hills, CA (US); Michael Chrzanowski, Albany, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 1338 days.

(21) Appl. No.: 12/103,675

(22) Filed: Apr. 15, 2008

(65) Prior Publication Data

US 2009/0258705 A1   Oct. 15, 2009

(51) Int. Cl.
*A63F 9/24* (2006.01)
*A63F 13/02* (2006.01)
*G06F 17/00* (2006.01)

(52) U.S. Cl.
USPC ......... 463/38; 463/7; 463/36; 463/37; 463/47

(58) Field of Classification Search
USPC ............................................ 463/7, 36–38, 47
See application file for complete search history.

(56) References Cited

U.S. PATENT DOCUMENTS

| 4,177,705 A | 12/1979 | Evangelista |
| 4,286,495 A | 9/1981 | Roof |
| 4,336,734 A | 6/1982 | Polson |
| 4,901,618 A | 2/1990 | Blum, Jr. |
| 4,974,486 A | 12/1990 | Wallace |
| 5,007,324 A | 4/1991 | DeMichele |
| 5,025,703 A | 6/1991 | Iba et al. |
| 5,072,643 A | 12/1991 | Murata |
| 5,085,119 A | 2/1992 | Cole |
| 5,095,799 A | 3/1992 | Wallace et al. |
| 5,113,742 A | 5/1992 | Matsumoto |
| 5,121,668 A | 6/1992 | Segan et al. |
| 5,121,669 A | 6/1992 | Iba et al. |
| 5,162,603 A | 11/1992 | Bunker |
| 5,270,475 A | 12/1993 | Weiss et al. |
| 5,393,926 A | 2/1995 | Johnson |
| 5,398,585 A | 3/1995 | Starr |
| 5,408,914 A | 4/1995 | Breitweiser, Jr. et al. |
| 5,488,196 A | 1/1996 | Zimmerman et al. |
| 5,557,057 A | 9/1996 | Starr |
| 5,585,583 A | 12/1996 | Owen |
| 5,670,729 A | 9/1997 | Miller et al. |
| 5,726,374 A | 3/1998 | Vandervoort |

(Continued)

OTHER PUBLICATIONS

"Power Tour Electric Guitar", User's Guide, Tiger Electronics, 2007 (12 pgs.).

*Primary Examiner* — Werner Garner
(74) *Attorney, Agent, or Firm* — Klein, O'Neill & Singh, LLP (57) ABSTRACT

A music based video game provides an auxiliary palm input on an associated guitar shaped video game controller. In some embodiments, the auxiliary palm input is positioned near a strum input on a body of the guitar shaped video game controller, allowing for simultaneous operation of both the strum input and the auxiliary palm input with one hand. In some embodiments, the auxiliary palm input modifies audio outputs generated in the music based video game. In some embodiments, the auxiliary palm input triggers an alternate game mode, for example, a bonus mode, during video game play of the music based video game.

7 Claims, 8 Drawing Sheets

(56) References Cited

U.S. PATENT DOCUMENTS

| | | |
|---|---|---|
| 5,739,455 A | 4/1998 | Poon |
| 5,744,744 A | 4/1998 | Wakuda |
| 5,777,251 A | 7/1998 | Hotta et al. |
| 6,018,119 A | 1/2000 | Mladek |
| 6,063,994 A | 5/2000 | Kew et al. |
| 6,191,348 B1 | 2/2001 | Johnson |
| 6,191,350 B1 | 2/2001 | Okulov et al. |
| 6,225,547 B1 | 5/2001 | Toyama et al. |
| 6,390,923 B1 * | 5/2002 | Yoshitomi et al. ............ 463/43 |
| 6,541,692 B2 | 4/2003 | Miller |
| 6,800,797 B2 | 10/2004 | Steiger, III |
| 6,846,980 B2 | 1/2005 | Okulov |
| 7,112,738 B2 | 9/2006 | Hyakutake et al. |
| 7,238,875 B2 | 7/2007 | Aiba |
| 7,320,643 B1 | 1/2008 | Brosius et al. |
| 2001/0035088 A1 * | 11/2001 | Faecher ......................... 84/609 |
| 2009/0046064 A1 * | 2/2009 | Manalo et al. ................ 345/164 |

* cited by examiner

MUSIC VIDEO GAME WITH GUITAR CONTROLLER HAVING AUXILIARY PALM INPUT

BACKGROUND OF THE INVENTION

The present invention relates generally to video games, and particularly to a music based video game using a guitar shaped video game controller with an auxiliary palm input.

Video games may provide a virtual reality, where video game players may experience and participate in various types of activities. Many of the activities video game players participate in are activities they would not otherwise be able to experience or enjoy in the real world. For example, music based video games often provide a virtual environment where video game players may play or operate a simulated version of a musical instrument. In many of these instances, the video game players may not be proficient at the real instrument counterparts of the simulated instruments they are playing, or may never have even seen or practiced playing the real instrument counterparts. Some video game controllers have been designed to somewhat replicate real instruments, further enhancing the video game experience. An example of these video game controllers are guitar shaped video game controllers. By operating one of these guitar shaped video game controllers, video game players may experience, to a certain extent, the feeling and excitement of playing a real guitar.

Simulated instruments are not accurate substitutes of their real instrument counterparts, and typically do not purport to be. Often, music based video games incorporating these simulated instruments provide video game players with their own set of unique challenges. However, video game designers and players alike may prefer the simulated instruments to stay faithful to the real instrument counterparts, thereby providing increased replication of operation or playing of the real instrument counterparts.

SUMMARY OF THE INVENTION

The present invention provides a music related video game and palm mute feature. In one aspect the invention provides a video game controller, comprising: a body; a neck extending from the body, the neck defining an axis of extension; a strum input on the body, the strum input positioned along the axis extension; a plurality of fret inputs on the neck; an auxiliary input on the body approximate the strum input, the auxiliary input positioned along the axis of extension further from the neck than the strum input; and circuitry for providing input signals indicative of operation of the strum input, the plurality of fret inputs, and the auxiliary input to a video game console.

In another aspect the invention provides a method of applying a modification to an audio output in a music based video game, comprising: determining an initial audio output based on input signals received from a strum input and a plurality of fret inputs of a video game controller; detecting an activation of an auxiliary input associated with an output modification; and outputting a modified version of the initial audio output; wherein the auxiliary input is located on the video game controller such that a user of the video game controller may activate the strum input with a hand, and simultaneously activate the auxiliary input with a palm of the hand.

In another aspect the invention provides a system for providing a bonus mode in a music based video game, comprising: a display; at least one video game controller including a strum input and an auxiliary input concurrently accessible to a one hand of a user of the at least one video game controller; and a processor configured by program instructions to generate on the display a visual interface of the bonus mode in the music based video game, the program instructions including instructions for: detecting a request from the auxiliary input to activate the bonus mode; applying processing changes associated with the bonus mode to the music based video game; processing input signals from the strum input with the applied processing changes; generating the visual interface based in part on the input signals processed with the applied processing changes; exiting the bonus mode; and generating the visual interface without the applied processing changes.

These and other aspects of the invention are more fully comprehended on review of this disclosure.

DETAILED DESCRIPTION

Figure 1:
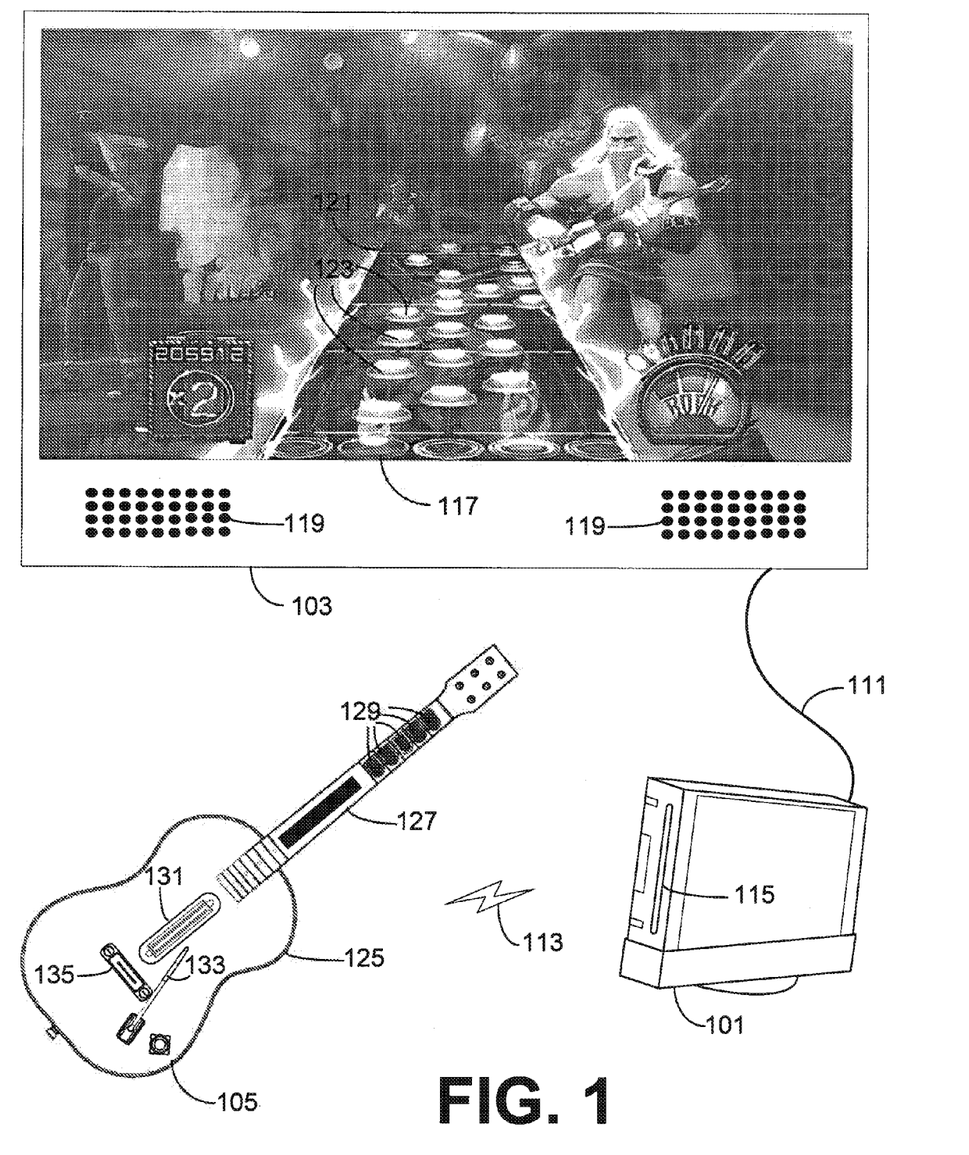
FIG. 1 is a video game system in accordance with aspects of the invention.

FIG. 1 is a video game system in accordance with aspects of the invention. The video game system includes a video game console 101 communicating with a display unit 103 and at least one video game controller 105. In the embodiment of FIG. 1, the video game console is connected to the display unit by an audio-video cable 111, and is communicating wirelessly 113 with the video game controller. The video game console processes information pertaining to video game play of a particular video game. The information may include video game instructions stored on a removable memory source, for example, a video game CD-ROM, program instructions stored in a console memory directing the processor as to how to process the video game instructions, and user input signals generated by a user operating the at least one video game controller.

The video game console generally includes circuitry configured to process a video game. The circuitry includes at least one processor, a memory, and a removable memory interface 115 for insertion of the removable memory source storing video game instructions for specific video games. The internal circuitry also includes means of communication with the video game controller, be it a wired or wireless connection, and an audio-video port for connecting with a display unit.

In FIG. 1, the video game system is processing a music based video game. The video game console reads the removable memory source and generates audio and video output signals to the display unit. The display unit is generally a television set, with a display screen 117 and audio speakers 119 or similar audio output devices. The audio and video output signals displayed on the display unit include user instructions pertaining to video game play. A screen shot shows a user interface in certain embodiments of the invention. The user interface shows a musical note track 121, including instructive cues, for example, instructive cues 123, in the shape of notes or gems. The instructive cues direct a user using the video game controller as to how the user should operate the video game controller. Points may be awarded, and audio portions of a song may be played, based on user compliance with the instructive cues.

In the embodiment of FIG. 1, the video game controller is a guitar shaped video game controller. The guitar shaped video game controller includes a guitar body 125 and a guitar neck 127 extending from the guitar body. In place of strings are a plurality of fret buttons 129, located on the guitar neck. A strum bar 131 may be moved up or down to simulate the strumming of guitar strings. The strum bar is centrally located on the video game controller, in the proximity of where the strings of a real guitar would be strummed. The video game controller of FIG. 1 also includes a tremolo arm 133 on the guitar body, which may be used to vary pitch of strummed notes or for other purposes.

The video game controller also includes an auxiliary input 135, located on the guitar body, adjacent the end of the strum bar opposite the guitar neck. The auxiliary input is positioned such that a user strumming the strum bar may also use the palm of the strumming hand, for example, the heel of the palm of the strumming hand, to depress the auxiliary input. As illustrated in FIG. 1, the auxiliary input is an elongated strip, for example, in the form of a bar, and the auxiliary input may be considered a palm bar.

The user plays or operates the guitar shaped video game controller based on the instructive cues presented on the display unit, and is assessed a user score in the context of video game play based on the user's compliance with the instructive cues. The video game controller includes circuitry for generating input signals reflective of the user's operation of the video game controller and for providing the input signals to the video game console. For example, the control circuitry may generate input signals indicative of operation of inputs of the video game controller, for example a strum input signal when a strum is detected, and a combination of fret input signals associated with a fingering combination performed by the user at the time the strum is detected. In most embodiments the circuitry of the video game controller includes communication circuitry for communicating the input signals to a video game console or computer unit. In some embodiments the video game controller includes wireless communication circuitry, for example a wireless transmitter or wireless transceiver, for communicating the input signals to a video game console or a computer unit. In some embodiments the video game controller provides the input signals to the video game console or computer unit through a wired connection.

In embodiments of the invention, the auxiliary input may also be used to generate input signals. In some embodiments, the auxiliary input may be used to activate a bonus mode, in which users may, for example, earn bonus points for compliance with the instructive cues. In other embodiments, the auxiliary input may affect the audio output of a played note or chord or portion of a song in various ways, for example, muffling or muting an audio output.

Figure 2:
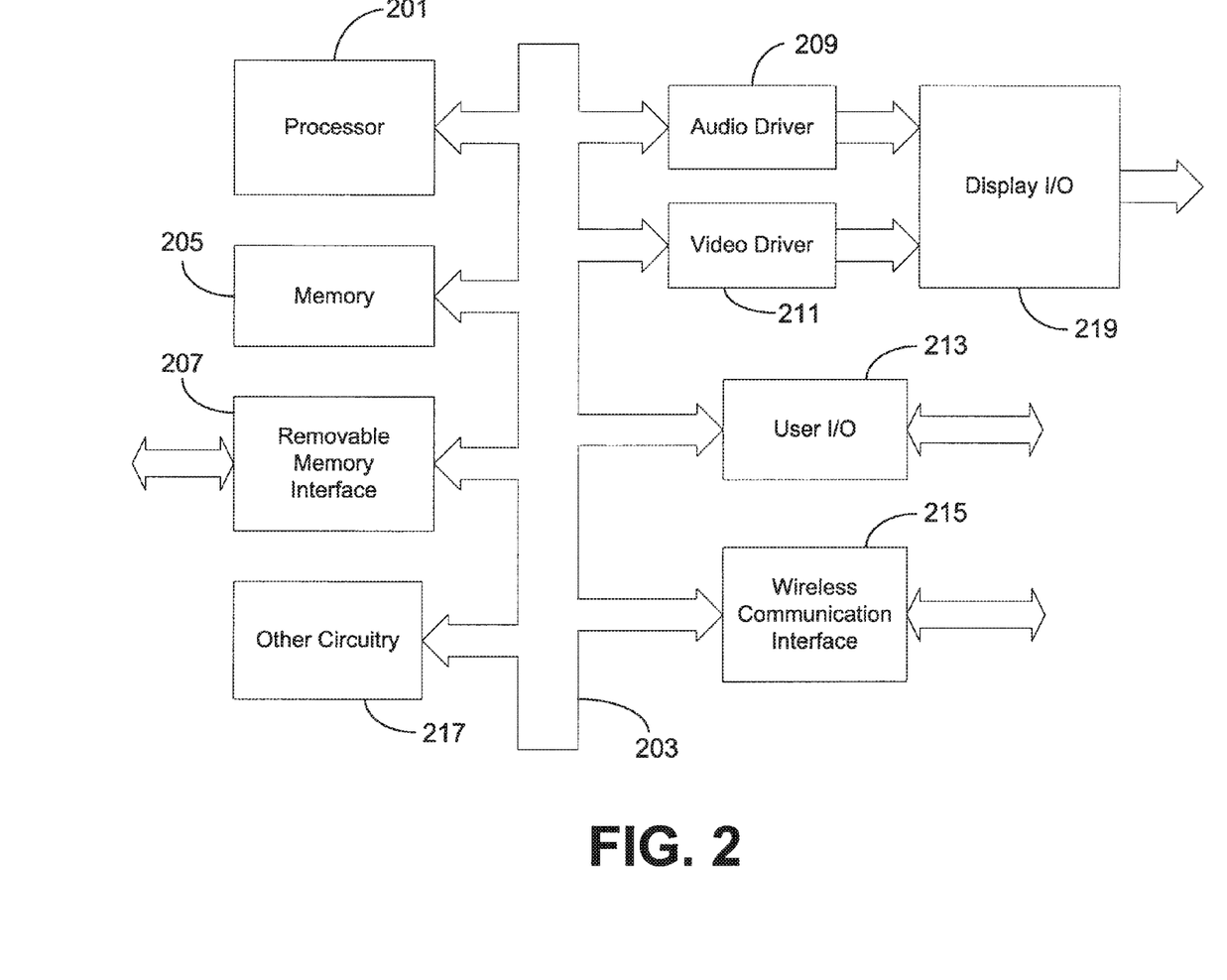
FIG. 2 is a block diagram of a processing unit in a video game console in accordance with aspects of the invention.

FIG. 2 is a block diagram of a processing unit in a video game console in accordance with aspects of the invention. In some embodiments, the processing unit may be found in the video game console illustrated in FIG. 1, and may be used to process video game instructions to facilitate play of the music based video game described with respect to FIG. 1. In some embodiments, the processing unit includes a processor 201 communicating with a variety of components via a system bus 203. Components may include memory 205, a removable memory interface 207, an audio driver 209 and video driver 211, a user input/output port 312, a wireless communication interface 215, and other circuitry 217. Different video game consoles may include different combinations of components in their processing units based on application and use of the video game consoles. In the embodiment of FIG. 2, the audio and video drivers are also connected to a display input/output port 219 which connects the video game console to an external display unit.

The processor utilizes the different components in conjunction with executing various video game instructions for a particular video game. Each video game console has specific program instructions associated with, for example, proper running of video games compatible with the video game console, and for example, accessing the various components of the processing unit. The program instructions are generally stored in the memory of the video game console, and retrieved by the processor as needed during video game processing. The video game console processes video game instructions for specific video games stored on removable memory sources which are inserted into the removable memory interface of the video game console. The removable memory sources may be in the form of, for example, video game CD-ROMs or video game cartridges compatible with the video game console.

The video game console generates audio and video output signals based on the video game instructions and the program instructions, and provides the signals to users of the video game system. The processor directs output generation information to the audio and video drivers, which process the information to produce, respectively, the audio and video output signals. The drivers send the outputs to a display input/output port, or alternatively, to separate audio and video input/output ports. The signals are routed, typically through an audio-video cable, to a display unit, where the audio and video outputs are communicated to the users. Each user, in turn, operates a video game controller in response to the audio and video outputs, and each video game controller generates input signals and transmits them to the video game console. These signals are received by either the user input/output port for wired video game controllers, or the wireless communication interface for wireless video game controllers.

The processor of the video game console processes received input signals in conjunction with the video game instructions and program instructions described above. The processor may modify output generation instructions using the input signals to personalize video game play based on user operation of the video game controller. In the context of a music based video game, output modifications may include, for example, adjustments to a user assigned score based on game play, or for example, different audio outputs associated with the playing of a song or musical score.

Figure 3:
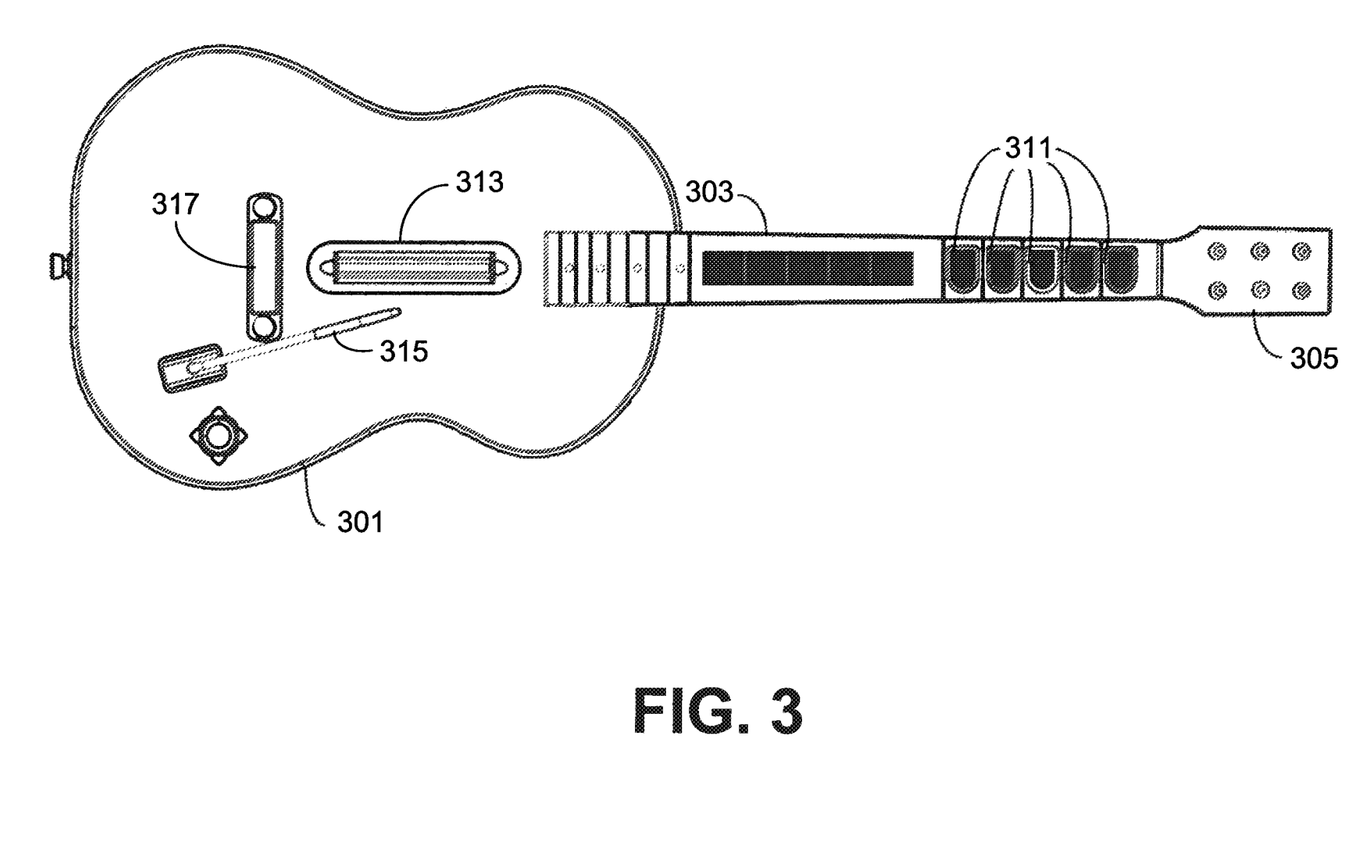
FIG. 3 is an embodiment of a guitar shaped video game controller with an auxiliary input button in accordance with aspects of the invention.

FIG. 3 is an embodiment of a guitar shaped video game controller with an auxiliary input button in accordance with aspects of the invention. In some embodiments, the guitar shaped video game controller is the video game controller illustrated in the video game system of FIG. 1, and may be used in accordance with a music based video game featuring playing of a simulated instrument, for example, a simulated guitar. In these embodiments, the video game controller of FIG. 3 may be operated by a user to generate input signals which are transmitted to a video game console. The video game console processes the input signals and generate audio and video outputs based on the operation of the video game controller. The audio and video outputs may be directed towards playing of the simulated guitar.

In FIG. 3, the guitar shaped video game controller includes a guitar body 301, a guitar neck 303 extending from the body and terminating in a guitar head 305. A plurality of fret button inputs 311 are located on the guitar neck adjacent the guitar head, although in various embodiments additional buttons may be located on the neck, or touch sensitive pads. A strum bar input 313 is centrally located on the guitar body, sharing a major axis with an axis of extension of the guitar neck from the guitar body. In simulated guitar play using the guitar shaped video game controller, the fret buttons may substitute for strings on a real guitar, and user depression of different fret button combinations may simulate chord fingerings performed on the strings. While a fret button combination is being depressed on the video game controller, the strum bar may be strummed up or down, to simulate the strumming of the strings on a real guitar. As a particular chord fingering is associated with a particular guitar chord on a real guitar, fret button combinations are mapped to different simulated guitar chord outputs. Therefore, users may finger different fret button combinations, and strum the strum bar input to generate different simulated guitar notes or chords.

Nearer the base of the guitar body is a tremolo arm assembly 315. The tremolo arm assembly may be used, for example, to alter the pitch or create a vibrato effect on held notes. When a chord is strummed on an acoustic or electric guitar, the note resonates for a duration of time after the strum is performed. On electric guitars, a strummed note may be held for several seconds after the strum. During the note hold, the tremolo arm may be pushed or pulled to slightly deflect the pitch of the held note, or may be rocked back and forth to create a vibrato effect on the held note. The tremolo arm assembly on the guitar shaped video game controller of FIG. 3 may be used to simulate the same effect on held notes during video game play.

Various other types of input devices may be available on different embodiments of the invention. Different input devices may be used to generate different audio outputs, or to alter audio outputs to be generated or audio outputs being held.

In the embodiment of FIG. 3, the guitar shaped video game controller includes an auxiliary input 317 located centrally on the guitar body. In FIG. 3, the auxiliary input is a typical button switch, which generates input signals upon depression. The auxiliary input is elongated and substantially rectangular in shape, and has a major axis running perpendicular to the axis of extension of the guitar neck from the guitar body. The major axis of the auxiliary input is also perpendicular to the major axis of the strum input, and the location of the auxiliary input may be described as adjacent an end of the strum input opposite the neck. In other embodiments, an auxiliary input may be located in various positions on the video game controller, and may embody different types of input devices. In some embodiments the auxiliary input may be a spring loaded button, with spring tension of the spring loaded button greater, for example, than a spring tension of buttons on the neck. In some embodiments the auxiliary input may provide an analog or multi-bit signal indicative of degree of depression of the auxiliary input, and in some embodiments the auxiliary input may be a pressure sensitive pad.

In operation, the video game controller of FIG. 3 may be held with fingers of a user's hand resting over the strum bar input. Consequently, in this position, the auxiliary input is located under a portion of the palm of the hand. Therefore, the location of the auxiliary input allows it to be depressed by the palm of the user's hand without extraneous movement of the user's fingers away from the strum bar. The position of the auxiliary input provides for easy access during game play, when a user is operating the guitar shaped video game controller.

The auxiliary input may be used in a variety of ways. For example, in some embodiments, the auxiliary input may be utilized as a palm mute device. When playing a real guitar, a palm mute is executed by pressing the strumming hand across all the guitar strings and strumming notes while the hand is in contact with the strings, producing muted guitar notes or chords. On a guitar shaped video game controller, activating the auxiliary input during game play may serve as a substitute to this technique. In other embodiments, the auxiliary input may be used to activate a bonus mode, for example a temporarily enabled potential score multiplier or Star Power as in the Guitar Hero series of games. Bonus modes may be activated to increase a user's ability to earn points in the context of video game play, or may modify audio and video outputs in different ways, based on the particular embodiment of the invention. In addition, in some embodiments the auxiliary input may be used to change audio associated with simulated guitar play or otherwise modify guitar effects associated with simulated guitar play. Further, in some embodiments a music rhythm video game may provide instructive cues for video game controller operation, and the instructive cues may include instructive cues for operation of the auxiliary input, with users scored based on extent of compliance with the instructive cues.

Figure 4:
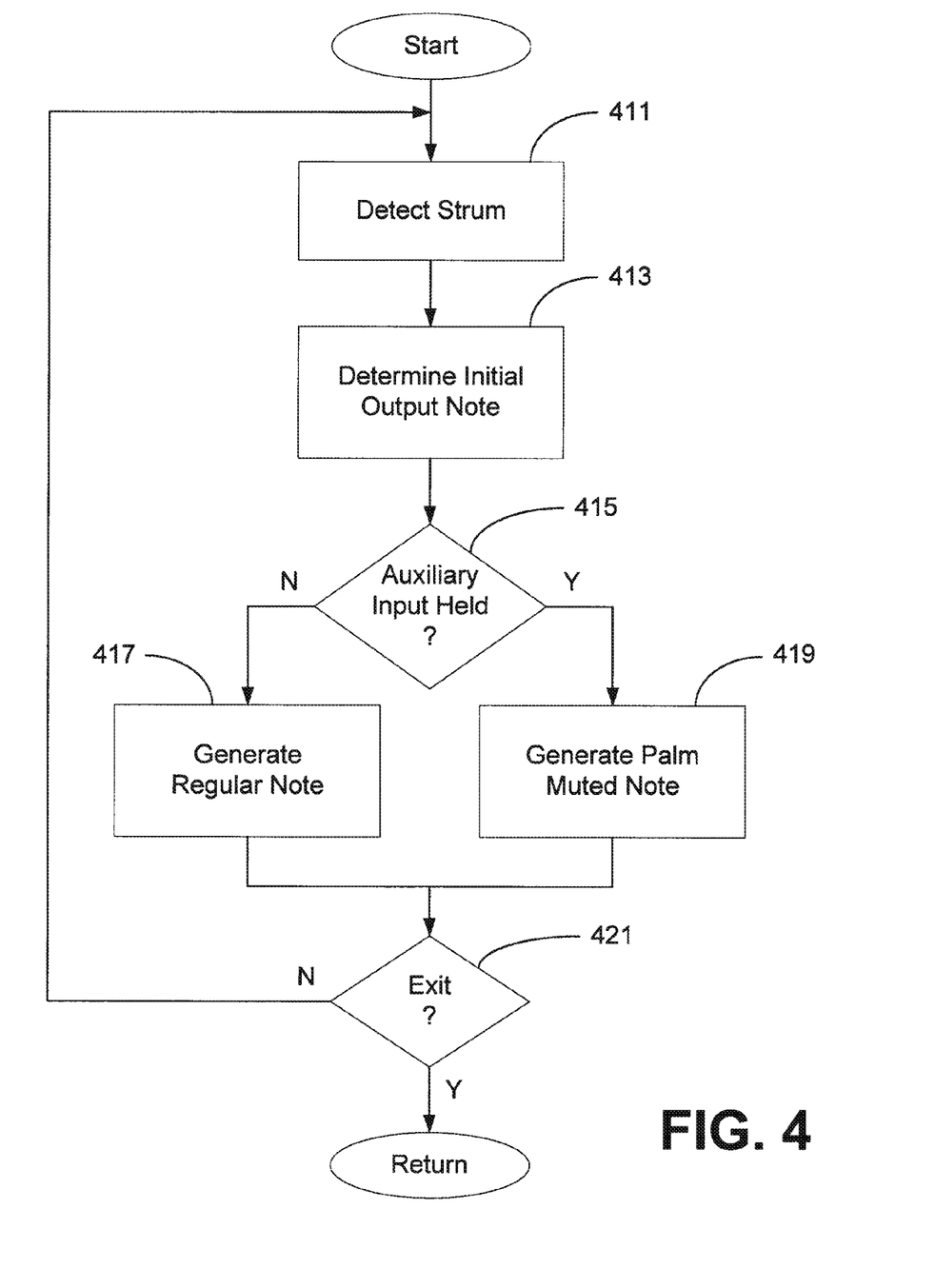
FIG. 4 is a flow diagram of the process of determining whether to generate a regular note or a palm muted note in accordance with aspects of the invention.

FIG. 4 is a flow diagram of the process of determining whether to generate a regular note or a palm muted note in accordance with aspects of the invention. The process, or portions of the process, may be performed, for example, by the video game console of FIG. 1 or the processor of FIG. 2. The process of FIG. 4 may be performed, for example, in embodiments where the auxiliary input of FIG. 3 is used as a palm mute button. In some of these embodiments, the auxiliary input may be multi-functional, being used as a palm mute device in certain video game scenarios, and used for different purposes in other video game scenarios.

In some embodiments, instructive cues may be provided by the music based video game dictating when to activate the palm mute button. In these embodiments, the display may provide instructive cues instructing users how to operate the video game controller, for example, which fret buttons to depress on the video game controller. The instructive cues may also provide information on when a particular combination of fret buttons is to be depressed, for example, when an instructive cue or set of instructive cues passes through a predefined area on the display. In these embodiments, the same instructive cues may sometimes be displayed in an alternate form, for example, in a different shape or color. The alternate form may instruct users to operate the fret buttons of the video game controller in the same manner, while simultaneously having the palm mute button activated as well. Alternatively, in other embodiments, a distinctive cue may indicate to a user to activate the palm mute button independently of any other input device on the video game controller.

In block 411, the process detects a strum input signal. A strum input signal may be generated by a video game controller when a strum input device on the video game controller is deflected or depressed. In embodiments of the invention with guitar shaped video game controllers, a strum deflection is associated with the playing of a note in the context of a music based video game. The generated strum input signal is sent from the video game controller to the video game console, and detected by, for example, a processor of the video game console. In some embodiments, however, in block 411 the process instead or in addition detects a change in fret button status.

In block 413, the process determines an initial output note or chord. In most embodiments, the processor may receive additional input signals with, or shortly after, receipt of a strum input signal. The processor selects an audio note or chord to output based in part on the additional input signals. In most embodiments with a guitar shaped video game controller, the additional input signals includes information on a combination of activated fret inputs of a plurality of fret input buttons. In these embodiments, the processor may determine an audio output to generate by selecting an audio chord mapped to the particular combination of activated fret inputs received from the video game controller. In other embodiments, the process may determine an initial note or chord by processing another input signal or a combination of other input signals received from the video game controller, or based on song information otherwise available to the process.

In block 415, the process determines whether an auxiliary input on the video game controller is being pressed or held. In the embodiment described, the auxiliary input is used as a palm mute input during the process of FIG. 4. In some embodiments, the auxiliary input may have been held at the time of a strum. In some embodiments, the auxiliary input may be pressed and/or held after a strum. The video game controller may continually generate input status information and transmit the information to an associated video game console. As such, the video game console may be continually aware of the status of the auxiliary input. Therefore, a depression of the auxiliary input may be detected by the video game console, regardless of whether the auxiliary input was depressed before, during, or after receipt of a strum input signal. If an auxiliary input signal is not detected, the process proceeds to block 417. If an auxiliary input signal is detected, the process instead proceeds to block 419.

In block 417, the process generates a regular note. In the context of the music based video game described in conjunction with the invention, a regular note may be a simulated audio guitar chord, without any pitch modifications or deflections applied. In some embodiments, the generation of a regular note is performed when no note modifying input signals, for example, auxiliary input signals corresponding to are detected from the video game controller.

In block 419, the process generates a palm muted note. A palm muted note may be a note which is played while an input corresponding to a palm mute is being depressed or otherwise activated. In embodiments of the invention, a palm mute may be performed by depressing the auxiliary input while a note or chord is being played or held. In most embodiments, a palm mute may be performed before, during, or after a strum has been performed and a note played. In some embodiments, a palm mute may be pressed and released multiple times during a held note. In these embodiments, an outputted audio note may alternate between a regular note and its muted equivalent several times before the held note is released. In some embodiments, a pahn muted note may be an original audio note with a palm muted effect applied to it. In other embodiments, the music video game may include a set of alternate audio samples including muted versions of all the original audio notes.

In block 421, the process determines whether to exit the note generation process with palm mute detection. If the process decides to continue note generation, the process returns to block 411 to await detection of a subsequent strum. If the process decides to end note generation, the process returns.

Figure 5:
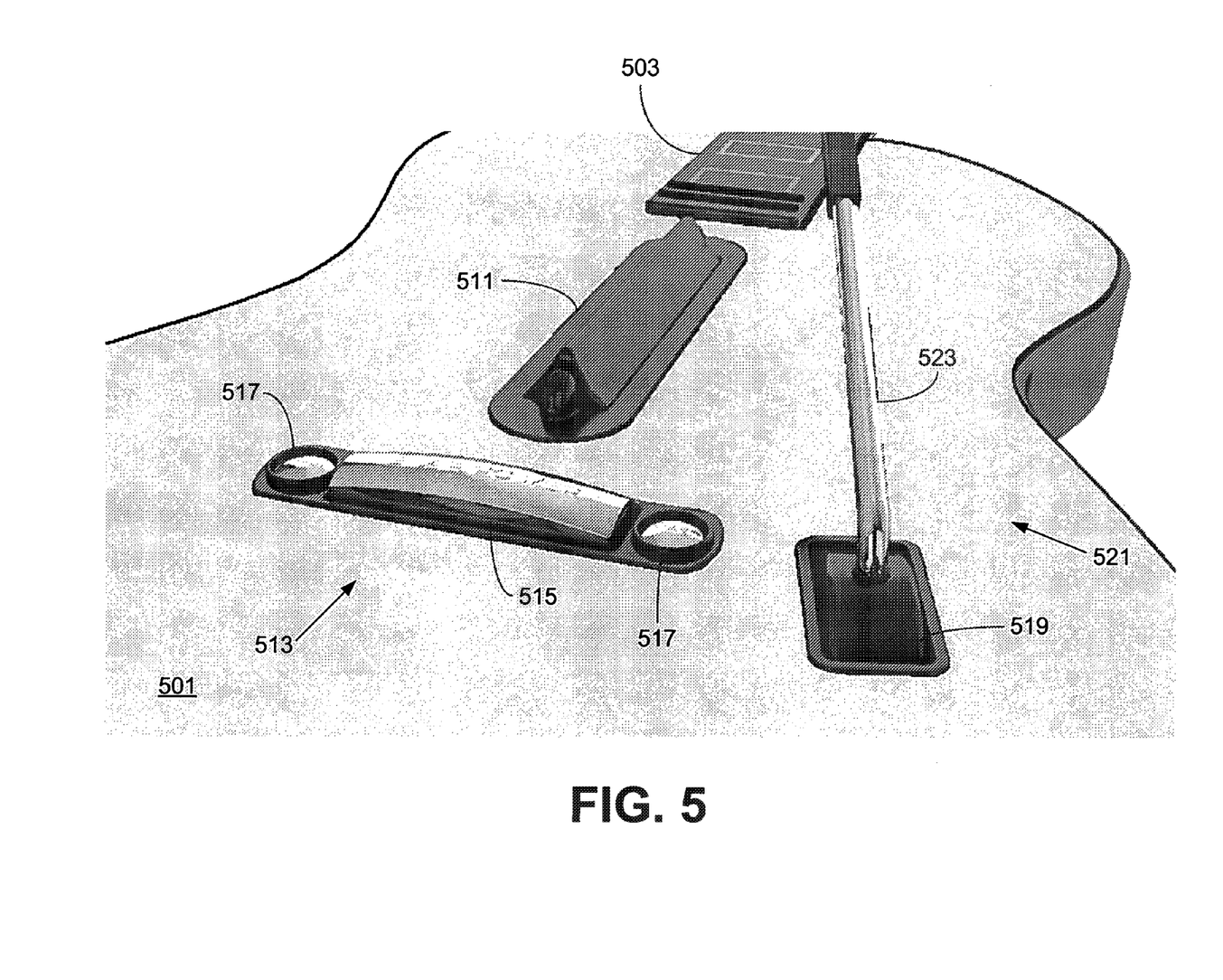
FIG. 5 is an illustration of another embodiment of a guitar shaped video game controller with a collection of auxiliary inputs in accordance with aspects of the invention.

FIG. 5 is an illustration of another embodiment of a guitar shaped video game controller with a collection of auxiliary inputs in accordance with aspects of the invention. The illustration of FIG. 5 may be seen as a close up perspective view of the body of a guitar shaped video game controller embodiment.

As has been consistent with other guitar shaped video game controllers described in accordance with the invention, the guitar shaped video game controller illustrated in FIG. 5 includes a guitar body 501, and a guitar neck 503 extending from the guitar body. A strum bar 511 is located adjacent the neck of the guitar shaped video game controller, and is positioned so that it shares a major axis with the axis of extension of the guitar neck from the guitar body. A collection of auxiliary inputs 513 is located further down the guitar body, adjacent the end of the strum bar opposite the guitar neck. The auxiliary inputs include an elongated and substantially rectangular shaped auxiliary input 515, with a longitudinal axis perpendicular the major axis of the strum bar. The auxiliary input is flanked by two smaller circular auxiliary inputs 517, located along the auxiliary input's longitudinal axis. A base 519 of a tremolo arm assembly 521 is located further down and to one side of the strum bar, near one of the circular auxiliary inputs, and a bar 523 of the tremolo arm assembly extends from the base in the general direction of the strum input.

In the embodiment of FIG. 5, the strum bar input may be used to generate input signals, which are processed by the video game console in determining audio outputs. A user of the guitar shaped video game controller may operate the video game controller by placing fingers of either the right or left hand over the strum bar input, while using the other hand to support the guitar neck. The user may use the thumb or alternate finger to move the strum bar input up or down to generate the input signals. The tremolo arm assembly and auxiliary inputs are in close proximity of the strum bar input, thereby providing users with easy access to the input devices while keeping their fingers close to the strum bar input. The tremolo arm may be harnessed by, for example, the pinky of the strumming hand, while the thumb remains positioned to perform a strum.

Likewise, the auxiliary inputs are positioned so that they rest under the palm of a user while his fingers are in position to perform a strum. Therefore, even while strumming, a user may push his palm against the guitar body to activate one of the auxiliary inputs. In the embodiment of FIG. 5, the elongated auxiliary input is the primary auxiliary input, and is sized to be much larger than the circular auxiliary inputs. Furthermore, the elongated auxiliary input may be raised slightly near its center, as is the case in FIG. 5, more easily conforming to the shape of a user's palm. In other embodiments, there may be more or less auxiliary inputs located on the guitar shaped video game controller, and they may be arranged differently than the arrangement illustrated in FIG. 5.

Figure 6:
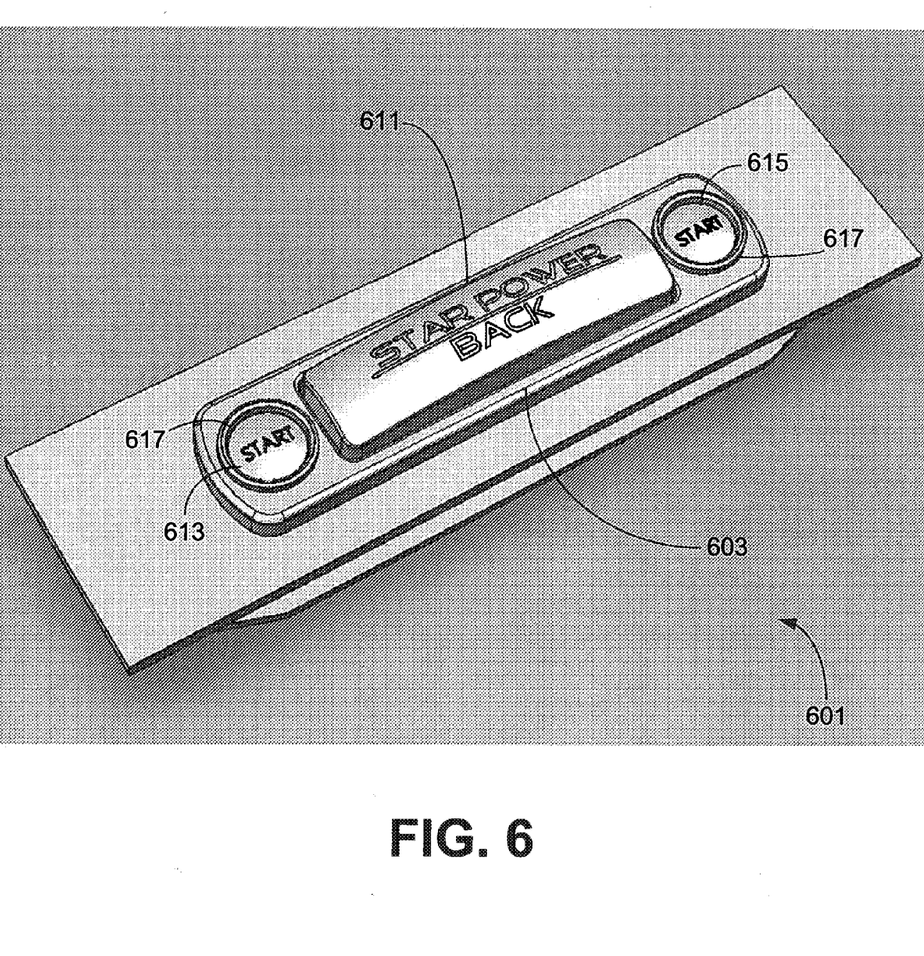
FIG. 6 is an illustration of an embodiment of a set of auxiliary inputs in accordance with aspects of the invention.

FIG. 6 is an illustration of an embodiment of a set of auxiliary inputs in accordance with aspects of the invention. In some embodiments, the set of auxiliary inputs 601 of FIG. 6 are the auxiliary inputs presented and discussed with relation to FIG. 5. The auxiliary inputs include a centrally located Star Power button 611. The Star Power button is elongated in shape, with the titles "Star Power" and "Back" on a top surface of the button. In the embodiment of FIG. 6, the button protrudes from a surface 603, and is rounded, so that a center of the button protrudes further from the surface than the button's edges. The auxiliary inputs also include a pair of Start buttons. The pair of Start buttons are circular and smaller in size than the Star Power button, and include "Start" labels on their top surfaces. A first Start button 613 may be found to the left of the Star Power button, and a second Start button 615 may be found to the right of the Star Power button. In the embodiment of FIG. 6, the Start buttons are slightly recessed from the surface, and ridges 617 protrude around each Start button. As the Star Power button prominently protrudes from the surface, and the Start buttons are recessed, users may more easily depress the Star Power button during video game play, without accidentally pressing down on either Start button. In these embodiments, Start buttons may be depressed, therefore, only if it is the user's intention to do so.

In embodiments of the invention, the Star Power button may be used to activate an alternate game mode, for example, a Star Power mode. In the Star Power mode, users of the music based video game may be able to accumulate points at a quicker pace, and the audio and video outputs generated by the video game may be slightly modified or altered. The Start button may also affect video game action in various ways, for example, pausing game play, or for example, presenting restart or various other options to a user. In some embodiments, the Star Power button and Start buttons may be used for a variety of other purposes. For example, when navigating through menus of the video game, the Start buttons may be used to select options provided by the video game, and the Star Power button may serve to, for example, access a previous menu.

Figure 7:
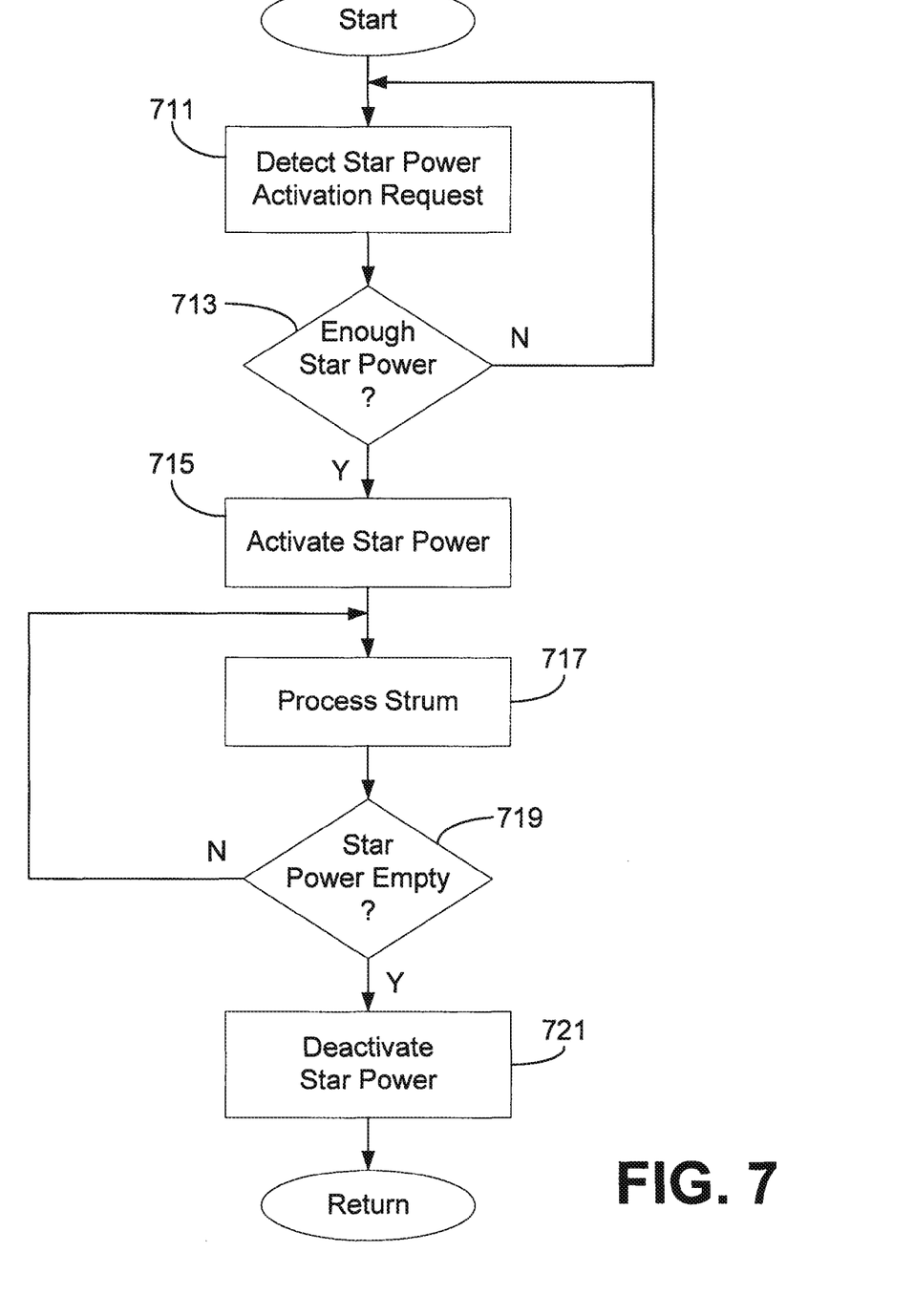
FIG. 7 is a flow diagram of the process of activating Star Power in a music based video game in accordance with aspects of the invention.

FIG. 7 is a flow diagram of the process of activating Star Power in a music based video game in accordance with aspects of the invention. In some embodiments, the process of FIG. 7 may be performed in a music video game using the guitar shaped video game controller of FIG. 5, or the set of auxiliary inputs of FIG. 6. In some embodiments, an alternate game mode may be triggered or entered into when an auxiliary input is depressed. An example of an alternate game mode is Star Power.

In block 711, the process detects a Star Power activation request. Star Power activation may be requested, for example, if a designated Star Power button is depressed. In some embodiments, other methods may be available to users to request activation of Star Power. For example, Star Power activation may be requested if a user generates a strum input while activating a certain fret combination. In embodiments where the guitar shaped video game controller includes an accelerometer, Star Power may be activated by different position changes the accelerometer may detect, for example, if a user moves the guitar shaped video game controller so that a guitar neck points straight up in the air.

In block 713, the process determines whether the user has accumulated enough Star Power to activate Star Power mode. In many embodiments of the music based video game, a bonus meter is provided to users, the bonus meter indicating the amount of Star Power accumulated by the user in the context of video game play. In some of these embodiments, Star Power may only be activated if the bonus meter, or Star Power meter, has reached a certain threshold, for example, half of the Star Power meter. In other embodiments, Star Power may be activated regardless of the level indicated by a provided Star Power meter, so long as some Star Power has been accumulated by the user. In yet other embodiments, a meter may not be provided, and an alternate mode, Star Power or otherwise, may be entered into whenever a request is received. Where a threshold or other prerequisites are implemented, if the prerequisites have not been met, the process returns to block 711, and awaits a subsequent activation request. If, however, the prerequisites for entering the alternate mode have been met, for example, the Star Power meter has reached a certain threshold in the embodiment presented in FIG. 7, the process proceeds to block 715.

In block 715, the process activates a Star Power mode. In some embodiments, Star Power mode may provide a bonus mode to users. When activated, Star Power may allow users to, for example, accumulate points faster or to generate slightly different sounding audio outputs. Star Power may also modify the video output to inform users that Star Power is activated. For example, the video game display may be decorated in different colors or shades, and may be accented or highlighted, for example, with a bluish hue. In other embodiments of the invention, various different types of modes, which alter game play in different ways, may be activated using a similar process.

In block 717, the process processes a strum while in Star Power mode. In embodiments where a guitar shaped video game controller is operated in conjunction with a music based video game, a strum input may generally be associated with generation of a simulated audio note or chord. In most of these embodiments, strums processed in Star Power mode are generally processed similarly to strums processed in a regular mode or an alternative mode. That is, a strum input is detected, and a combination of activated fret inputs are processed to determine an output note or chord. There may be differences in strum processing while in Star Power mode, for example, the differences described with respect to block 715. For example, the generated output may be modified or output at a higher volume, a simulated crowd or fans may cheer louder, and/or a user score may be increased, for example, doubled, during Star Power mode.

In block 719, the process determines whether the user has any Star Power remaining. In some embodiments, Star Power mode serves as a bonus mode, where users may accumulate points at a quicker pace than in a regular mode. Star Power mode is therefore limited in many embodiments. Otherwise, users may choose to continually remain in Star Power mode, or any similarly configured bonus mode. In some of these embodiments, users may accumulate Star Power during video game play. The amount of Star Power a user has accumulated during video game play may determine the duration a user may remain in Star Power mode after it has been activated. In embodiments of the invention with a bonus meter, for example, the Star Power meter as described with respect to the process of block 713, the meter may serve as a timer. In these embodiments, once Star Power mode has been activated, the level of the Star Power meter is slowly reduced. If the process determines that there is still Star Power remaining in the Star Power meter, the process may remain in Star Power mode. The process returns to block 717 and processes the next detected strum input in Star Power mode. If the process determines that the Star Power meter is empty, the process instead proceeds to block 721.

In block 721, the process deactivates Star Power mode, or alternate bonus mode. In embodiments including a Star Power meter, deactivation of the Star Power mode may indicate that the Star Power meter is empty. This generally indicates that a user's Star Power has been exhausted. Upon exhaustion of a user's Star Power, the process generally returns to a regular mode of video game play. After Star Power mode has been deactivated, the process returns. In most embodiments, after star power has been deactivated, the user is allowed to start accumulating Star Power once again, in an effort to work towards activating the Star Power mode, or other bonus mode, later on during video game play.

Figure 8A:
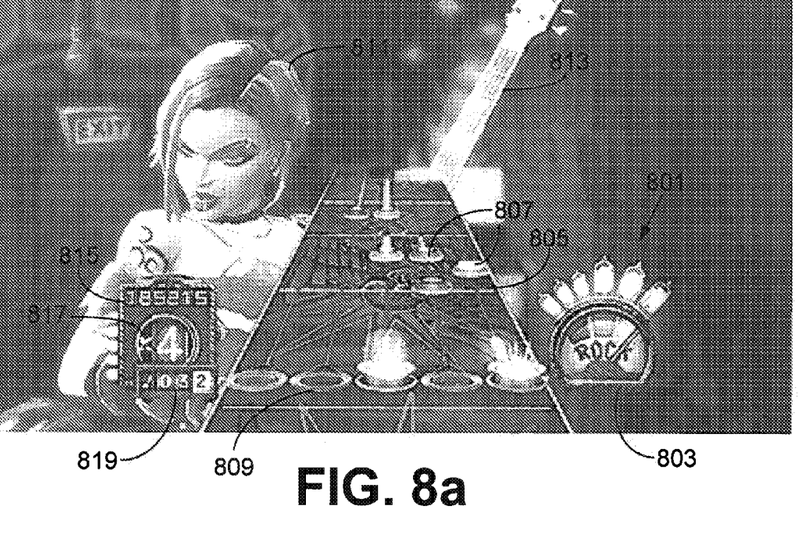
FIGS. 8a and 8b are examples of screenshots of a music based video game at different instances during video game play in accordance with certain embodiments of the invention.
Figure 8B:
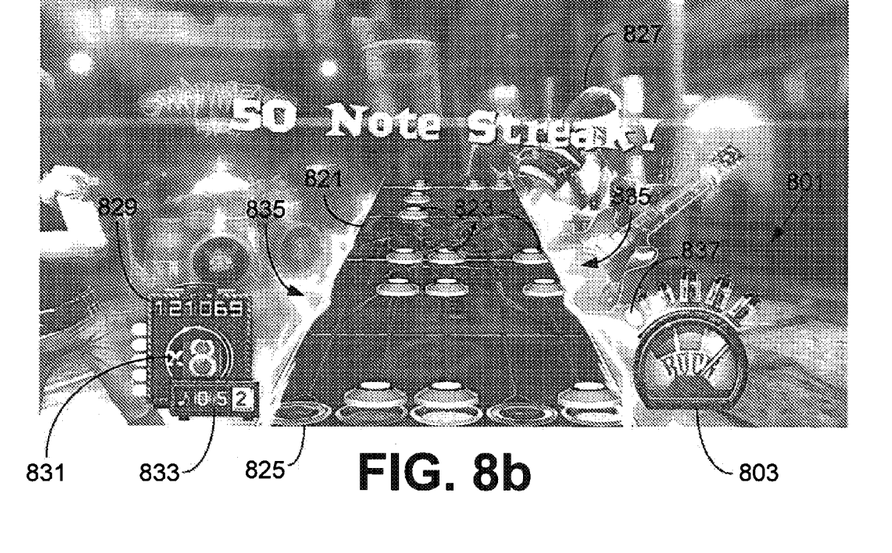

FIGS. 8a and 8b are examples of screenshots of a music based video game at different instances during video game play in accordance with certain embodiments of the invention. Both FIGS. 8a and 8b include Star Power meters 801, which may indicate a user's Star Power level, or alternative bonus meter level, in the context of game play. In some embodiments, the Star Power meter may be comprised of a series of light bulbs, and may be in contact or close proximity to a separate and unrelated meter. In FIGS. 8a and 8b, the Star Power meter is located near the bottom right corner of each screenshot, and is positioned above a separate user power meter 803. In other embodiments, the Star Power meter may be visualized in different shapes and at different positions on the display. In some embodiments, the Star Power meter may be associated with a bonus mode, for example, the Star Power mode described with respect to the process of FIG. 7, and the Star Power meter may correspond to the Star Power meters described with respect to block 713 and 719 of FIG. 7.

FIG. 8a is a screenshot of a music based video game in a regular mode in accordance with aspects of the invention. The screenshot includes a centrally located music track 805 including instructive cues, for example, instructive cues 807. The instructive cues may be in the form of colored gems, as is the case in FIG. 8a, or in various other shapes or forms. The instructive cues represent fret buttons on a guitar shaped video game controller, and each horizontal set of instructive cues comprises a note to be played on the video game controller using the represented fret buttons. The music track including colored gems scrolls down, and crosses a stationary horizontal checkpoint 809. The music based video game of FIG. 8a is configured to instruct players to play the guitar notes indicated by the instructive cues at the instant the instructive cues cross the horizontal checkpoint.

FIG. 8a also displays a variety of different forms of video outputs to communicate information to users. In some embodiments, a main character 811 representing the user is displayed. In music based video games with guitar shaped video game controllers, the main character is similarly a lead guitarist of a band or other guitarist handling a guitar 813. In many of these embodiments, the main character is user selected, and in some instances, user created.

There are also various user status indicators, for example, a user score indicator 815, a score multiplier indicator 817, and a current streak indicator 819 to the left of the music track. The user score indicator displays a current score the user has accumulated in game play, where generally, more compliance yields a higher user score. The current streak indicator indicates, for example, the number of correct notes the user has consecutively played on the guitar shaped video game controller without missing a note or playing an incorrect note. A score multiplier indicates a multiplier applied to points the user earns during game play, in FIG. 8a being "×4," indicating that points are currently being multiplied by four. In many embodiments, the score multiplier may be tied to the current streak, whereby the multiplier increases as the user plays more consecutive notes correctly, and the score multiplier resets to, for example, "×1" if a note is missed or an incorrect note is played. In some embodiments, a cap or upper limit is imposed on the score multiplier, so that the score multiplier may not exceed, for example, "×4" in the regular mode. In other embodiments, the score multiplier may be applied differently depending on the embodiment of the invention.

To the right of the music track are the aforementioned user power meter and Star Power meter. The user power meter indicates to users the amount of energy the user has remaining, where in most instances, the game ends if the power meter is exhausted or becomes empty. In most embodiments of the invention, the power meter level decreases if an incorrect note is played, or if a cued note is missed. In some embodiments, users may regain a portion of their user power level by correctly playing notes, although in most of these embodiments, the rate of power recovery is slower than the rate of depletion as penalty for user mistakes.

In FIG. 8a, a series of light bulbs are attached to the top of the user power meter. The light bulbs indicate a Star Power meter in the context of the video game. In other embodiments of the invention, the Star Power meter may be displayed using other meter types or forms. Star Power may be accumulated during game play in different ways, for example, by consecutively playing a certain number of correct notes, or for example, for earning a certain amount of points. In FIG. 8a, each of six Star Power meter light bulbs are lit, indicating that the user's Star Power meter is full. In some embodiments, the user may be allowed to activate a Star Power mode at any time, so long as the Star Power meter is not empty. In other embodiments, Star Power mode may only be available once the Star Power meter is full, or alternatively, if the Star Power meter has reached a certain capacity, for example, once three out of the six light bulbs have been lit. In most embodiments, Star Power is consumed with game play, and the duration a user may stay in Star Power mode is dependent on the level of the Star Power meter when Star Power is activated.

FIG. 8b is an example of a screenshot of the music based video game in a Star Power mode in accordance with aspects of the invention. Users may activated Star Power mode, for example, through the process described in FIG. 7. Many of the visual features of FIG. 8b mirror the same corresponding features displayed in FIG. 8a. The screenshot includes a music track 821 with instructive cues, for example, instructive cues 823, and a horizontal checkpoint 825, as well as a user selected, guitar wielding, character 827 in the background. Status indicators, for example, a user score indicator 829, a score multiplier indicator 831, a current streak indicator 833, a user power meter, and a Star Power meter, are likewise displayed, and serve substantially the same purposes in video game play as their counterparts described with respect to FIG. 8a.

There may also be both game play and visual differences between a regular mode, as depicted in FIG. 8a, and a Star Power mode, as depicted in FIG. 8b. In Star Power mode, the colored gems or alternative instructive cues may all be shaded the same color, for example, a bright blue tint. Furthermore, the music track may be enhanced or lined in a similar bright blue tint, for example, with bright blue electric currents 835 running along the sides of the music track. The enhancements may serve to indicate to a user that Star Power mode has been activated or is currently active. In some embodiments, Star Power mode may be considered a bonus mode, where users may accumulate points at a faster rate. Being in Star Power mode may alter video game play or point accumulation. For example, the score multiplier may be doubled, and the cap or upper limit on the score multiplier may be increased, for example, from "×4" to "×8" while Star Power mode is activated. In some embodiments, the user power meter may be increased at a faster rate when the user plays correct notes, and may decrease at a slower rate for user miscues, while in Star Power mode.

In embodiments with Star Power mode, or other bonus-type mode, there are generally time limits applied to these bonus-type modes. Otherwise, users may elect to remain in the bonus-type modes all the time. The Star Power meter is a visual indication of the time the user has remaining in Star Power mode. In some embodiments, the user may have activated Star Power mode with six lit light bulbs, indicating a full Star Power meter, as was seen in FIG. 8*a*. And as can be seen in the Star Power meter of FIG. 8*b*, only one 837 of the six light bulbs remains lit, indicating that the user's Star Power is about to run out. In some embodiments, the light bulbs may slowly turn off one by one while the user is in Star Power mode or similar bonus mode, and the Star Power mode may end when, for example, all of the light bulbs have been turned off. In most of these embodiments, the user is returned to a regular mode, at which time, the point bonuses may be turned off, and the visual enhancements removed, returning the visual display to, for example, an embodiment similar to the screenshot illustrated and described with respect to FIG. 8*a*.

The invention therefore provides for an auxiliary input for a guitar shaped video game controller in, for example, a music rhythm video game. Although the invention has been described with respect to certain embodiments, it should be recognized that the invention may be practiced other than as specifically described, the invention comprising the claims and their insubstantial variations supported by this disclosure.

What is claimed is:

1. A video game controller, comprising:
   a body;
   a neck extending from the body, the neck defining an axis of extension;
   a strum input on the body, the strum input comprising a strum bar positioned along the axis of extension, the strum bar being configured to be rotated around the axis of extension to provide strum input signals;
   a plurality of fret inputs on the neck;
   an auxiliary input on the body approximate the strum input, the auxiliary input positioned along the axis of extension further from the neck than the strum input;
   a pair of additional inputs, a one of the pair of additional inputs positioned on each side of the auxiliary input, wherein the auxiliary input protrudes from a front surface of the body, and the pair of additional inputs is recessed from the front surface of the body; and
   circuitry for providing input signals indicative of operation of the strum input, the plurality of fret inputs, and the auxiliary input to a video game console.

2. The video game controller of claim 1, wherein the strum input and auxiliary input are both elongated in shape, the strum input having a longitudinal axis along the axis of extension, and the auxiliary input having a longitudinal axis perpendicular to the axis of extension.

3. The video game controller of claim 2, wherein the longitudinal axis of the strum input coincides with the axis of extension.

4. The video game controller of claim 1, wherein the auxiliary input is positioned to be depressible by a palm of a hand at the same time the hand is operating the strum input.

5. The video game controller of claim 1, wherein the circuitry includes wireless communication circuitry.

6. A method of applying a modification to an audio output in a music based video game by utilizing a video game controller as claimed in claim 1, the method comprising:
   determining an initial audio output based on input signals received from a strum input and a plurality of fret inputs of the video game controller;
   detecting an activation of an auxiliary input associated with an output modification; and
   outputting a modified version of the initial audio output;
   wherein the auxiliary input is configured as a multi-functional input based on the music based video game and is located on the video game controller such that a user of the video game controller may activate the strum input with a hand by rotating the strum input with respect to the axis of extension, and simultaneously depress the auxiliary input with a palm of the hand.

7. The method of claim 6, wherein the modification is a muting effect.

* * * * *